United States Patent
Hieda et al.

(12) 
(10) Patent No.: US 7,019,459 B2
(45) Date of Patent: Mar. 28, 2006

(54) STRUCTURE FOR PREVENTING GLASS FROM BREAKING AND PLASMA DISPLAY DEVICE

(75) Inventors: Yoshihiro Hieda, Osaka (JP); Motoshige Tatsumi, Osaka (JP); Yukiko Azumi, Osaka (JP); Seiji Kijima, Osaka (JP); Kazuhiko Miyauchi, Osaka (JP); Toshitaka Nakamura, Osaka (JP); Tsukasa Sato, Osaka (JP)

(73) Assignee: Nitto Denko Corporation, Ibaraki (JP)

( * ) Notice: Subject to any disclaimer, the term of this patent is extended or adjusted under 35 U.S.C. 154(b) by 560 days.

(21) Appl. No.: 10/224,598

(22) Filed: Aug. 21, 2002

(65) Prior Publication Data

US 2004/0052080 A1    Mar. 18, 2004

(51) Int. Cl.
*H01J 17/49* (2006.01)
*H01J 1/62* (2006.01)

(52) U.S. Cl. .................................. 313/582; 313/491

(58) Field of Classification Search ........ 313/582–587, 313/491–495
See application file for complete search history.

(56) References Cited

U.S. PATENT DOCUMENTS 6,346,334 B1   2/2002   Kamitani
6,417,619 B1 *  7/2002   Yasunori et al. ............ 313/582

FOREIGN PATENT DOCUMENTS

| DE | 33 22 442 A1 | 1/1985 |
|----|--------------|--------|
| EP | 1 134 072 A2 | 9/2001 |
| EP | 1 261 011 A2 | 11/2002 |
| GB | 2 074 089 A  | 1/1980 |
| JP | 06-333515    | 2/1994 |
| JP | 06-333517    | 2/1994 |
| JP | 11-174206    | 2/1999 |
| JP | 2002-248704  | 9/2002 |

OTHER PUBLICATIONS

European Search Report dated Jul. 9, 2003.

* cited by examiner

*Primary Examiner*—Joseph Williams
(74) *Attorney, Agent, or Firm*—McGinn IP Law Grp., PLLC

(57) ABSTRACT

A structure for preventing glass from breaking, having a combination of a surface glass breaking prevention material, a glass substrate and a metal plate arranged in the order, wherein an internal glass breaking prevention material made of an elastomer or viscoelastomer having a dynamic shear modulus of not larger than $1 \times 10^9$ Pa is interposed between the glass substrate and the metal plate. Particularly, in the glass breaking prevention structure configured as described above, destructive impact energy (B) by which the glass substrate is destroyed when a steel ball 50 mm in diameter and 500 g in weight is dropped on the surface glass breaking prevention material is not lower than 1.2 times as high as destructive impact energy (A) measured in the same manner upon a glass breaking prevention structure having the same configuration as the first-mentioned structure except that the internal glass breaking prevention material is not interposed.

18 Claims, 1 Drawing Sheet

STRUCTURE FOR PREVENTING GLASS FROM BREAKING AND PLASMA DISPLAY DEVICE

Figure 1:
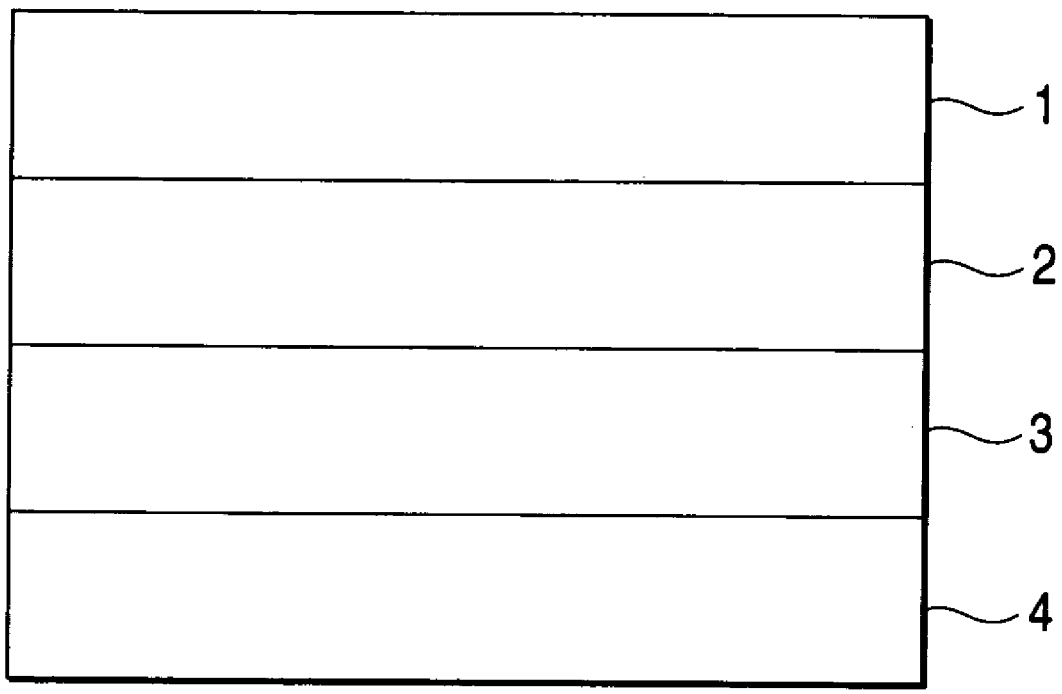

The present application is based on Japanese Patent Application No. 2001-048369, which is incorporated herein by reference.

BACKGROUND OF THE INVENTION

1. Field of the Invention

The present invention relates to a structure for preventing glass from breaking and a plasma display panel (hereinafter referred to as "PDP") device using this structure.

2. Description of the Related Art

A rule that all glass Braun tubes (cathode-ray tubes) should be shatterproof and impenetrable-(resistant to electric shock caused by a hole larger in size than a finger) in an impact resistance test due to dropping of a steel ball has been provided by safety standards (UL standards, the Law of Radio Regulations, etc.) for television sets and display devices. It was therefore necessary to design panel glass to be thick.

With respect to such a CRT glass panel, Unexamined Japanese Patent Publications No. Hei. 6-333515 and 6-333517, etc. have disclosed a glass Braun tube in which a synthetic resin protective film (a film of thermosetting urethane resin and polyester) having self-repairing characteristic is laminated as a weight-reducing unit in order to prevent the glass panel from becoming thick. The disclosed glass Braun tube, however, is only aimed at shatterproof characteristic. There was no description about prevention of the glass panel substrate from breaking. That is, the disclosed glass Braun tube was not provided for preventing the glass panel substrate from breaking.

On the other hand, Unexamined Japanese Patent Publication No. Hei. 11-174206 has described a protective filter for protecting an internal glass substrate of a flat panel display (any one of various kinds of LCDs and PDPs). As the protective filter, a front protection plate made of a transparent resin sheet was disposed at a distance of 10 mm or less from the display to thereby protect glass of the panel itself. According to this configuration, however, there was an air layer between the glass panel and the protection plate. Hence, there were a lot of problems in double reflection of external light, increase in reflectance, lowering of image sharpness due to parallax, and so on. In addition, because there was an air layer, dust, cigarette tar or the like was accumulated in the gap portion of the air layer. Hence, there was a problem that it was difficult to clean the gap portion.

Moreover, in the PDP in which both increase in size and reduction in weight are important, the thickness of the panel itself has a tendency to decrease. Setting the protective filter in a place far from the panel produces the reverse effect. That is, the known technique did not produce any thin and lightweight protective film for preventing the panel in the PDP large-size display from breaking.

In such a PDP, electric discharge is produced in rare gas, particularly gas mainly containing neon, enclosed in the inside of the panel, so that fluorescent substances of R, G and B provided in a cell in the inside of the panel are made luminescent by vacuum ultraviolet rays generated in the electric discharge. In the process of luminescence, electromagnetic wave and near infrared rays unnecessary for the operation of the PDP are emitted simultaneously. Particularly, electromagnetic wave emitted from the PDP needs to be shielded because radiant electromagnetic wave is restricted by VCCT, FCC, etc. and because there is recently a fear that electromagnetic wave has bad influence on the human body.

With respect to near infrared rays, the wavelength range of near infrared rays emitted from the PDP is from about 800 to about 1,200 nm. On the other hand, in most cases, a light-receiving element of an infrared sensor used in a remote controller for a household electrical product, a karaoke machine, an audio-video apparatus or the like has a reception sensitivity peak in a range of from about 700 to about 1,300 nm. For this reason, there is a problem that near infrared rays emitted from the PDP may cause malfunction of the remote controller. It is therefore necessary to cut off near infrared rays emitted from the PDP.

From such background, a filter for cutting off electromagnetic wave and near infrared rays emitted from the PDP has been discussed. For example, as filters for shielding electromagnetic wave, there are known: a film having metal mesh embedded therein; a glass or acrylic plate subjected to a patterning mesh process by etching; a plate formed in such a manner that a film having metal mesh embedded therein or a film subjected to a patterning mesh process by etching is stuck to a glass or acrylic plate; and a transparent multilayer thin-film laminate of a multilayer structure formed in such a manner that each metal thin-film layer is put between transparent thin-film layers. As filters for shielding near infrared rays, there have been already discussed filters constituted by combination of near infrared-absorbing materials such as near infrared absorbing color matters and Cu-complex phosphoric ester-based polymers.

Such a shield filter is, however, generally arranged as a front protection plate in a position at a distance of 10 mm or less from the PDP. That is, the shield filter is not directly stuck onto the PDP panel by a transparent pressure sensitive adhesive agent. This is because the glass substrate in the PDP panel is broken very easily and because the shield filter is arranged in a position far by a distance of from several mm to 10 mm from the PDP panel so that the shield filter can serve also as a front protection filter.

SUMMARY OF THE INVENTION

In consideration of such circumstances, an object of the invention is to provide a glass breaking prevention structure in which as a point of difference from the related-art PDP front plate, a breaking prevention material transparent is stuck directly onto a glass substrate of a PDP panel or the like to thereby eliminate any air layer to prevent double reflection of external light, make it possible to reduce weight and thickness and improve an effect of preventing glass from breaking and in which a function for shielding electromagnetic wave and near infrared rays can be added to this structure as occasion demands, and a PDP device using this glass breaking structure.

The present inventors have made eager examination to achieve the foregoing object. As a result, it has been found that when a glass breaking prevention structure is designed so that a surface glass breaking prevention material, a glass substrate and a metal plate are arranged in this order and so that the transparent breaking prevention material is stuck directly onto the glass substrate, a glass breaking prevention structure which can be reduced in weight and thickness can be obtained because there is no air layer between the glass substrate and the glass breaking prevention material and, accordingly, there is no problem in double reflection of external light. It has been also found that when an internal glass breaking prevention material having a predetermined structure is further interposed between the glass substrate and the metal plate in the glass breaking prevention structure, the effect of preventing glass from breaking is improved remarkably. It has been further found that when a function for shielding electromagnetic wave and near infrared rays, an anti-reflection function for reducing reflection of external light, a function for adjusting color in a visible region, and so on, are added to the surface glass breaking prevention material itself or a member having these functions is provided to be adjacent to the surface glass breaking prevention material in accordance with necessity, the glass breaking prevention structure having these functions added thereto can be obtained. Thus, the invention has been accomplished.

That is, the invention concerns a structure for preventing glass from breaking, having a combination of a surface glass breaking prevention material, a glass substrate and a metal plate arranged in the order, wherein an internal glass breaking prevention material made of an elastomer or viscoelastomer having a dynamic shear modulus of not larger than $1 \times 10^9$ Pa is interposed between the glass substrate and the metal plate.

In other words, a surface glass breaking prevention material is arranged on a first side on a glass substrate, and a metal plate arranged in a second side of the glass substrate. Further, an internal glass breaking prevention material which is made of one of an elastomer and a viscoelastomer and has a dynamic shear modulus of not larger than $1 \times 10^9$ Pa and is interposed between the second side of the glass substrate and the metal plate.

Particularly, the invention concerns a glass breaking prevention structure according to the configuration, wherein destructive impact energy (B) by which the glass substrate is destroyed when a steel bail 50 mm in diameter and 500 g in weight is dropped on the surface glass breaking prevention material is not lower than 1.2 times as high as destructive impact energy (A) measured in the same manner upon a glass breaking prevention structure having the same configuration as the first-mentioned structure except that the internal glass breaking prevention material is not interposed. Further, the invention concerns a PDP device having a glass breaking prevention structure configured as described above.

Incidentally, the "destructive impact energy (A), (B)" is calculated as "steel ball weight (0.5 Kg)×h (m)×9.8 (m/s$^2$)" in which h is the height from which a steel ball is dropped on the glass substrate to thereby destroy the glass substrate. The phrase "destroy the glass substrate" means occurrence of breaking, cracking or crazing in the glass substrate to cause an obstacle such as failure of light emission to the device function.

Features and advantages of the invention will be evident from the following detailed description of the preferred embodiments described in conjunction with the attached drawings.

DETAILED DESCRIPTION OF THE PREFERRED EMBODIMENTS

As shown in FIG. 1, a structure for preventing glass from breaking according to the invention substantially has a basic configuration in which a surface glass breaking prevention material 1, a glass substrate 3 (corresponding to a PDP) and a metal plate 4 are arranged in the order. In addition to the basic configuration, the structure further has a configuration in which an internal glass breaking prevention material 2 is interposed between the glass substrate and the metal plate. These respective constituent members will be described below in detail.

The surface glass breaking prevention material 1 is provided on the visual side of the glass substrate. That is, when the glass breaking prevention structure is applied to a PDP device, the surface glass breaking prevention material 1 is provided on the front surface side of the PDP on which a display image is displayed. It is therefore preferable that the visible light transmittance of the surface glass breaking prevention material 1 is not lower than 30%, particularly not lower than 40%, and that the visible light reflectance of the surface glass breaking prevention material 1 is not higher than 5%. The thickness of the surface glass breaking prevention material 1 may be preferably in a range of from 0.05 to 10 mm. If the surface glass breaking prevention material 1 is too thin, there is a problem in safety because the surface glass breaking prevention material 1 is not effective in preventing the glass panel substrate from breaking and shattering. If the surface glass breaking prevention material 1 is too thick, image quality of the PDP is lowered and the thickness of the surface glass breaking material 1 is contrary to reduction in weight and thickness of the PDP panel.

The configuration, composition and thickness of the surface glass breaking prevention material 1 are not limited if the material 1 has adhesion to the glass substrate and shock-absorbing characteristic for relaxing external impact as well as the material 1 has the visible light transmittance and the visible light reflectance. Examples of the material 1 include: a monolayer or multilayer structure formed from a material having both adhesion to the glass substrate and shock-absorbing characteristic; and a multilayer structure formed from a combination of a layer made of a material having adhesion to the glass substrate and a layer made of a material having shock-absorbing characteristic.

Examples of the material having both adhesion to the glass substrate and shock absorbing characteristic include an acrylic-based pressure sensitive adhesive agent, a rubber-based pressure sensitive adhesive agent, and a polyester-based pressure sensitive adhesive agent.

Especially, an acrylic-based pressure sensitive adhesive agent high in transparency is preferably used as the material. The acrylic-based pressure sensitive adhesive agent is made of an acrylic-based polymer which may contain a suitable additive as occasion demands. The acrylic-based pressure sensitive adhesive agent may be of a non-crosslinkable type and may be of a thermally crosslinkable type or an optically (ultraviolet light or electron beam) crosslinkable type.

The acrylic-based polymer is produced as follows. At least one kind of (meth) acrylic alkyl ester and, if necessary, at least one kind of functional group-containing monomer or copolymerizable monomer are polymerized in the presence of a suitable polymerization catalyst by a polymerization method such as a solution polymerization method, an emulsion polymerization method, a self-polymerization method (especially, a polymerization method using ultraviolet irradiation), or a suspension polymerization method so that the glass transition point (Tg) of the polymer is selected to be not higher than 60° C. in order to mainly provide moderate wettability and flexibility. In this manner, the acrylic-based polymer can be obtained.

The pressure sensitive adhesive agent may be replaced by an adhesive agent containing, as a main agent component, a natural high-molecular compound such as glue or starch, a semisynthetic high-molecular compound such as cellulose acetate, or a synthetic high-molecular compound such as polyvinyl acetate, polyvinyl chloride, epoxy resin, urethane resin, polychloroprene, acrylonitrile-butadiene copolymer, melamine resin, acrylic resin, ethylene-vinyl acetate copolymer, polyester resin or polyamide resin. These may be used as various curable types of adhesive agents such as an ordinary temperature-curable adhesive agent, a heat-curable adhesive agent, an ultraviolet-curable adhesive agent, an electron beam-curable adhesive agent, and a laser irradiation-curable adhesive agent.

Further, a resin excellent in transparency, mechanical strength, heat resistance, etc. is used as the material having shock-absorbing characteristic. Examples of the resin include polyester resin, (meth)acrylic resin, polycarbonate resin, polyethylene naphthalate resin, polyethylene terephthalate resin, triacetyl cellulose, resin "Arton", epoxy resin, polyimide resin, polyether-imide resin, polyamide resin, polysulfone, polyphenylene sulfide, and polyether-sulfone.

As other materials than these, there may be used: an ionomer resin obtained by crosslinking molecules of ethylene-methacrylate copolymer by metal ions ($Na^+$, $Zn^{2+}$, etc.); a thermoplastic resin such as ethylene-vinyl acetate copolymer, polyvinyl chloride resin, ethylene-acrylate copolymer, polyethylene, polypropylene, polybutyral resin, or polystyrene; and a thermoplastic elastomer exhibiting rubber elasticity, such as polystyrene-based elastomer, polyolefin-based elastomner, polydiene-based elastomer, polyvinyl chloride-based elastomer, polyurethane-based elastomer, polyester-based elastomer, polyamide-based elastomer, fluorine-based elastomer, chlorinated polyethylene-based elastomer, polynorbornene-based elastomer, polystyrene-polyolefin-based copolymer, (hydrogenated) polystyrene-butadiene-based copolymer, or polystyrene-vinyl polyisoprene-based copolymer. In addition, a blend of polyolefin such as polyethylene or polypropylene and the thermoplastic elastomer may be also used.

As the surface glass breaking prevention material 1, it is possible to use various multilayer structures such as polyolefin (polyethylene or polypropylene)/thermoplastic resin (ethylene-vinyl acetate copolymer)/polyolefin, polyolefin (polyethylene or polypropylene)/polyolefin+thermoplastic elastomer/polyolefin (polyethylene or polypropylene), multilayer bodies in various blend ratios of polyolefin+thermoplatic elastomer, polypropylene/polyethylene/polypropylene, Nylon/ethylene-vinyl acetate copolymer/Nylon, and copolymeric Nylon/ethylene-based adhesive agent/ethylene-vinyl acetate copolymer/ethylene-based adhesive agent/copolymeric Nylon. A multilayer structure of core/shell type resin having a core of thermoplastic elastomer and a shell structure of acrylic resin may be also used as the surface glass breaking prevention material 1.

In the invention, if necessary, desired functions such as a function for shielding electromagnetic wave or near infrared rays (800 to 1,200 nm), an anti-reflection function for reducing reflection of external light and a function for adjusting color in a visible region may be added to the surface glass breaking prevention material 1 itself (for example, the film layer of the shock-absorbing material). Or a member having these functions may be provided to be adjacent to the surface glass breaking prevention material 1. In this manner, the surface glass breaking prevention material 1 can be provided as a glass breaking prevention structure having at least one of these functions added thereto.

With respect to the electromagnetic wave shielding function, when the intensity of electric field radiated from a 42-inch single PDP is in a range of from 40 to 50 dB μV/m, the VCCI control value (10 m method) in Class A is not larger than 40 dB μV/m in a frequency range of from 30 to 1,000 MHz, particularly in a frequency range of from 30 to 230 MHz. In consideration of a margin of 6 to 7 dB, it is preferable that the shielding effect is not smaller than 10 dB, particularly 20 dB. The surface resistivity required for obtaining the shielding effect is preferably not larger than 3 $\Omega/cm^2$. With respect to the near infrared ray shielding function, near infrared ray (800 to 1,200 nm) transmittance is preferably not larger than 20%, particularly nor larger than 10% for the purpose of preventing household electrical appliances or optical communication from malfunctioning.

When metal mesh or patterning metal mesh is used for shielding electromagnetic wave, it is preferable that a plurality of coloring matters constituted by near infrared-absorbing dyes or pigments are used in order to reduce the near infrared ray transmittance to 20% or less.

Alternatively, these near infrared-absorbing dyes or pigments maybe added to an infrared reflecting material, which contains any kind of resin such as a thermoplastic resin, a thermosetting resin, an ultraviolet-curable resin or an electron beam-curable resin, and electrically conductive fine particles of indium compound oxide or the like reflecting light in an infrared region and dispersed into the resin, so that electromagnetic wave shielding can be combined with near infrared ray shielding.

The material especially suitable for shielding electromagnetic wave and near infrared rays is a transparent laminate of transparent thin-film layers and metal layers constituted by silver-based transparent electric conductor layers, wherein the transparent thin-film layers and the metal layers are laminated so alternately that n units ($2 \leq n \leq 5$) are laminated when a combination of a transparent thin-film layer and a metal layer is regarded as one unit. Specifically, the transparent laminate is formed in such a manner that a basic structure of any one of metal layer/transparent thin-film layer, transparent thin-film layer/metal layer/transparent thin-film layer and metal layer/transparent thin-film layer/metal layer is repeated by twice or more. The transparent laminate may be directly provided on the film layer of the shock-absorbing material constituting the surface glass breaking prevention material 1 or may be once formed on a transparent base material and then stuck together with the transparent base material onto the surface glass breaking prevention material 1.

Any material may be used widely as the material of each of the transparent thin-film layers in the transparent laminate if the material has optical transparency. A refractive index which is easy to achieve desired optical characteristic in optical design may be selected as the refractive index of each of the transparent thin-film layers. The two or more transparent thin-film layers may be different in material and refractive index from one another. The material of each of the transparent thin-film layers may be a single material or may be a material obtained by sintering a plurality of materials. Preferably, the material may have an effect in preventing migration of the metal thin-film layers and a barrier effect to water and oxygen. The preferred material for such transparent thin film layers is a compound of at least one member selected from the group consisting of indium oxide, tin oxide, titanium dioxide, cerium oxide, zirconium oxide, zinc oxide, tantalum oxide, niobium pentaoxide, silicon dioxide, silicon nitride, aluminum oxide, magnesium fluoride, and magnesium oxide.

Of the materials for the transparent thin film layers, a material containing indium oxide as a main component and a small amount of titanium dioxide, tin oxide, cerium oxide, etc. is especially preferred because the material has an effect in preventing deterioration of the metal thin-film layers and has electrically conducting characteristic to make it easy to attain electrical connection to the metal thin-film layers. The transparent thin-film layers can be formed by a vacuum dry process or wet method such as a sputtering method, a vacuum vapor deposition method or an ion plating method. The sputtering method is best in terms of controllability and uniformity of film thickness. The thickness of each of the transparent thin-film layers is preferably in a range of from 10 to 100 nm.

Each of the metal thin-film layers is made of a single silver metal or an alloy containing silver as a main component. The alloy contains 80% or more by weight of silver, and at least one element selected from the group consisting of gold, copper, palladium, platinum, manganese, and cadmium. A solid solution of 80 to 99% by weight of silver and 20 to 1% by weight of at least one element selected from the metal group is preferred as the material. Particularly, a solid solution of 1 to 20% by weight of gold in silver is preferred from the point of view of preventing deterioration of silver. If the gold content is higher than 20% by weight, transparency is apt to be spoiled because of coloring. If the gold content is lower than 1% by weight, silver is apt to deteriorate. A vacuum dry process such as a sputtering method is used as a method for forming the silver-based transparent electric conductor films. The thickness of each of the silver-based transparent electric conductor films is preferably in a range of from 1 to 30 nm, more preferably in a range of from 5 to 20 nm.

According to the transparent laminate of such transparent thin-film layers and such metal thin-film layers, the electromagnetic wave shielding effect can be easily set to be not smaller than 10 dB and the near infrared ray (800 to 1,200 nm) transmittance can be easily set to be not larger than 20%, so that the visible light transmittance can be kept 30% or higher. Incidentally, in order to enhance adhesion to a subject of adhesion such as a transparent base material on which the transparent laminate will be formed, another metal layer having a thickness of not larger than 10 nm for not deteriorating transparency may be formed on the subject of adhesion or a known adhesion facilitating treatment such as a corona treatment or a plasma treatment may be applied to a surface of the subject. Further, in order to reduce reflectance, a low-refractive-index layer having a refractive index of not higher than 1.50 may be formed between the transparent laminate and the subject of adhesion so that the low-refractive-index layer has an optical thickness of $\lambda/4n\pm15\%$.

Incidentally, in order to obtain the electromagnetic wave shielding effect, an electrode is provided on the electromagnetic wave shield layer such as the transparent laminate or metal mesh and electrically connected to a PDF housing or the like. A material excellent in electrical conducting characteristic, corrosion resistance, conservativeness against moist heat, adhesion to the shield layer, etc. is preferred as the material of the electrode. Specific examples of the material include: a silver paste; a metal selected from the group consisting of gold, silver, copper, and palladium or an alloy of two or more metals selected from this group; a mixture of the metal or alloy and an organic coating material; and an electrically conductive double-sided tape produced by impregnating copper mesh with a pressure sensitive adhesive agent. The electrode made of any one of these materials can be formed as follows. The electrode of an electrically conductive double-sided tape can be formed by sticking the tape directly to four sides of the electromagnetic wave shield layer. The electrode of any one of silver paste, various kinds of alloy materials, alloy mixture materials, etc. can be formed by a wet process method such as a screen printing method or a micro gravure coating method, by a dry process method such as a vacuum vapor deposition method or a sputtering method, or by a plating method.

With respect to the anti-reflection function for reducing reflection of external light, an anti-reflection treatment may be made to obtain visible light reflectance of 5% or lower, preferably 4% or lower in order to restrain deterioration of image display of the PDP or an anti-glare treatment may be made to obtain haze of 5% or lower in order to prevent glare of external light. An anti-contamination treatment may be further applied to the surface subjected to these treatments in order to prevent adhesion of dirt such as fingerprints. A hard coat treatment may be further made to obtain a surface (pencil) hardness of H or higher to thereby provide a surface protecting function. In order to achieve good image display of the PDP, coloring matter materials such as dyes or pigments may be further used for color adjustment in a visible region. These treatments may be directly applied to the film layer of the shock-absorbing material constituting the surface glass breaking prevention material 1 or a transparent functional film subjected to these treatments may be produced and then stuck onto surface glass breaking prevention material 1.

In the anti-reflection treatment, a low-refractive-index layer having a refractive index of 1.50 or lower, preferably 1.45 or lower can be formed. An inorganic or organic material excellent in transparency to visible light, durability, adhesion, etc. is used as the material of the low-refractive-index layer. Examples of the organic material include: fluorine-containing polymer polymerized from fluoroethylene, vinylidene fluoride, tetrafluoroethylene, etc.; partially or wholly fluorinated (meth)acrylic alkyl ester; and fluorine-containing silicone. Examples of the inorganic material include $MgF_2$, $CaF_2$, and $SiO_2$. Such a low-refractive-index layer can be formed by a wet process such as a micro gravure coating method or by a dry process such as a vacuum vapor deposition method or a sputtering method. The thickness of the low-refractive-index layer is generally preferably not larger than 1 μm, more preferably not larger than 0.5 μm.

An anti-contamination-treated layer may be further provided on the low-refractive-index layer. Examples of the material of the anti-contamination-treated layer include: an organic polysiloxane-based polymer; a hardened substance of a perfluoroalkyl-containing polymer; an alkoxysilane compound having a perfluoroalkyl group; a compound having a silyl group reactive to a perfluoropolyether group; and a monosilane or disilane compound containing a polyfluoroalkyl group. The thickness of the anti-contamination-treated layer is generally preferably in a range of from 0.001 to 0.5 μm, more preferably in a range of from 0.002 to 0.1 μm.

A high-refractive index layer (or a high-refractive-index anti-glare layer) having a refractive index of 1.5 or higher, preferably 1.6 or higher may be formed in another different anti-reflection treatment. An inorganic or organic material excellent in transparency to visible light, durability, adhesion, etc. is used as the material of the high-refractive-index layer. Examples of the organic material include: a material polymerized and hardened by applying an active energy beam such as an ultraviolet beam or an electron beam onto a polyfunctional polymerizable compound containing at least two (meth)acryloyl groups, such as urethane (meth)acrylate, polyester (meth)acrylate or polyether (meth)acrylate; and a material crosslinked and hardened by heating across linkable resin material such has a silicone-based resin, a melamine-based resin or an epoxy-based resin.

Examples of the inorganic material include: a material containing indium oxide as a main component, and a small amount of titanium dioxide, tin oxide and cerium oxide; $CeF_3$; $Al_2O_3$; MgO; $TiO_2$; and ZnO. The organic material may further contain inorganic fine particles of oxide of a metal, such as aluminum, titanium, zirconium or antimony, dispersed therein. Such a high-refractive-index layer (or the high-refractive-index anti-glare layer) can be formed by a wet process such as a micro gravure coating method or by a dry process such as a vacuum vapor deposition method or a sputtering method. The thickness of the high-refractive-index layer is preferably not larger than 50 μm, more preferably not larger than 10 μm.

In the hard coat treatment, an ultraviolet-curable or electron beam-curable material or a heat-curable material is used. An example of the ultraviolet-curable material is a mixture of a photopolymerization initiator, and a monomer or oligomer such as ester monomer/oligomer, acrylic monomer/oligomer, urethane monomer/oligomer, acrylic-urethane monomer/oligomer, amide monomer/oligomer, silicone monomer/oligomer, epoxy monomer/oligomer or acrylic-epoxy monomer/oligomer. The electron beam-curable material need not contain any photopolymerization initiator. An example of the heat-curable material is a material obtained by mixing a crosslinker, a polymerization initiator, a polymerization accelerator, a solvent, a viscosity modifier, etc. with a resin such as phenol-based resin, urea-based resin, melamine-based resin, unsaturated polyester-based resin, polyurethane-based resin or epoxy-based resin in accordance with necessity. It is also possible to use an inorganic/organic hybrid resin obtained by chemically bonding a silicone-based resin and an acrylic resin to each other or a material obtained by dispersing inorganic fine particles of silicon oxide, zirconium oxide, indium-tin oxide, tin oxide or the like into the resin in such a manner that transparency is not spoiled. In order to enhance adhesion to a subject of adhesion, additives containing carboxyl group, phosphate group, hydroxy group, amino group, isocyanate group, etc. may be mixed with these materials. A leveling agent, an antistatic agent, an ultraviolet-absorbent, etc. may be further mixed with these materials. The thickness of the hard coat layer is preferably in a range of from 0.1 to 20 μm, more preferably in a range of from 1 to 10 μm.

In the invention, at least one transparent protective layer excellent in mechanical strength, heat resistance, etc. may be disposed on the exposed surface side of the surface glass breaking prevention material 1 so that glass can be prevented from shattering even when the PDP panel is destroyed. As the transparent protective layer, it is possible to use a film or molded plate of any one of polyester resin, (meth) acrylic resin, polycarbonate resin, polyethylene naphthalate resin, polyethylene terephthalate resin, triacetyl cellulose, resin "Arton", epoxy resin, polyimide resin, polyether-imide resin, polyamide resin, polysulfone, polyphenylene sulfide, polyether-sulfone, etc; or a shatterproof glass plate.

In the invention, any glass material such as soda-lime glass or high distortion spot glass can be used as the glass substrate 3 without any particular limitation if the glass material can be used in a plasma display. The thickness of the glass substrate 3 is generally in a range of from about 0.5 to 5 mm. The glass substrate 3 may be of a single layer structure with one sheet of glass or may be of a multilayer structure with two or more sheets of glass. Generally, a double glass structure with two glass plates as in a PDP panel is used in a large size display.

In the invention, the metal plate 4 is disposed on the inner side of the glass substrate 3 in the display such as a PDP. The metal plate has a function for fixing various kinds of parts and the glass substrate. The kind of metal used in the metal plate 4 is not particularly limited. Any metal material may be used if the metal material can be used in a display such as a PDP. Because the display requires lightness in weight, strength, and so on, aluminum or aluminum-based alloy or stainless steel may be preferably used as the material. The thickness of the metal plate 4 is not limited. That is, a thickness allowed to be used in a display may be used as the thickness of the metal plate 4.

In the invention, the basic configuration is that the surface glass breaking prevention material 1, the glass substrate 3 and the metal plate 4 are disposed in the order. In addition to the basic configuration, the internal glass breaking prevention material 2 with a specific configuration may be further interposed between the glass substrate 3 and the metal plate 4 as a distinctive feature of the invention. In the specific configuration, the glass breaking prevention effect can be improved greatly compared with the glass breaking prevention structure without interposition of the internal glass breaking prevention material 2.

The internal glass breaking prevention material 2 is made of an elastomer or viscoelastomer having a dynamic shear modulus of not larger than $1 \times 10^9$ Pa. The thickness of the internal glass breaking prevention material 2 is preferably in a range of from 0.01 to 50 mm. If the dynamic shear modulus is larger than this value, the shock-absorbing characteristic becomes too low to improve the glass breaking prevention effect. The "dynamic shear modulus" means a measured value of dynamic shear modulus G (equivalent to dynamic storage shear modulus G') at 25° C.±3° C. in a fixed condition of a frequency of 1 Hz due to temperature dispersion in use of a dynamic viscoelasticity measuring machine DMS120 made by SEIKO INSTRUMENTS INC. Generally, tensile modulus E of elasticity and dynamic shear modulus G have the relation E=3G. That is, tensile modulus E is about three times as large as dynamic shear modulus G.

Because the internal glass breaking prevention material 2 is provided on the inner side of the glass substrate, that is, on the rear surface side of the PDP panel opposite to image display, the internal glass breaking prevention material 2 is different from the surface glass breaking prevention material 1 in that transparency is not necessary for the internal glass breaking prevention material 2. Hence, any material may be used widely as the internal glass breaking prevention material 2 if the material is made of an elastomer or viscoelastomer having the dynamic shear modulus. First, a pressure sensitive adhesive agent such as an acrylic-based pressure sensitive adhesive agent, a rubber-based pressure sensitive adhesive agent or a polyester-based pressure sensitive adhesive agent may be preferably used as the material. Particularly, an acrylic-based pressure sensitive adhesive agent is preferably used. The acrylic-based pressure sensitive adhesive agent contains an acrylic-based polymer, and suitable additives which may be mixed with the acrylic-based polymer as occasion demands. The acrylic-based pressure sensitive adhesive agent may be of a non-crosslinkable type or may be of a thermally crosslinkable type or an optically (ultraviolet or electron beam) crosslinkable type.

The acrylic-based polymer is produced as follows. At least one kind of (meth) acrylic alkyl ester and, if necessary, at least one kind of functional group-containing monomer or copolymerizable monomer are polymerized in the presence of a suitable polymerization catalyst by a polymerization method such as a solution polymerization method, an emulsion polymerization method, a self-polymerization method (particularly, a polymerization method using ultraviolet irradiation), or a suspension polymerization method so that the glass transition point (Tg) of the polymer is selected to be not higher than 60° C. in order to provide moderate wettability and flexibility mainly. In this manner, the acrylic-based polymer can be obtained.

Further, the pressure sensitive adhesive agent may be replaced by an adhesive agent containing, as a main agent component, a natural high-molecular compound such as glue or starch, a semisynthetic high-molecular compound such as cellulose acetate, or a synthetic high-molecular compound such as polyvinyl acetate, polyvinyl chloride, epoxy resin, urethane resin, polychloroprene, acrylonitrile-butadiene copolymer, melamine resin, acrylic resin, ethylene-vinyl acetate copolymer, polyester resin or polyamide resin. These may be used as various curable types of adhesive agents such as an ordinary temperature-curable adhesive agent, a heat-curable adhesive agent, an ultraviolet-curable adhesive agent, an electron beam-curable adhesive agent, and a laser irradiation-curable adhesive agent.

A resin material excellent in shock-absorbing characteristic and excellent in mechanical strength, heat resistance, etc. may be also used. Examples of the resin material include polyester resin, (meth)acrylic resin, polycarbonate resin, triacetyl cellulose, resin "Arton", epoxy resin, polyimide resin, polyether-imide resin, polyamide resin, polysulfone, polyphenylene sulfide, and polyether-sulfone.

As other materials than these example, there may be used: an ionomer resin obtained by crosslinking molecules of ethylene-methacrylate copolymer by metal ions ($Na^1$, $Zn^{21}$, etc.); a thermoplastic resin such as ethylene-vinyl acetate copolymer, polyvinyl chloride resin, ethylene-acrylate copolymer, polyethylene, polypropylene, polybutyral resin, or polysthyrene; and a thermoplastic elastomer, such as polystyrene-based elastomer, polyolefin-based elastomer, polydiene-based elastomer, polyvinyl chloride-based elastomer, polyurethane-based elastomer, polyester-based elastomer, polyamide-based elastomer, fluorine-based elastomer, chlorinated polyethylene-based elastomer, polynorbornene-based elastomer, polystyrene-polyolefin-based copolymer, (hydrogeneted) polystyrene-butadiene-based copolymer, or polystyrene-vinyl polyisoprene-based copolymer. Alternatively, a blend of polyolefin such as polyethylene or polypropylene and the thermoplastic elastomer may be also used.

Further, as structures of combination of these materials, it is possible to use various multilayer structures such as polyolefin (polyethylene or polypropylene)/thermoplastic resin (ethylene-vinyl acetate copolymer)/polyolefin, polyolefin (polyethylene or polypropylene)/polyolefin+thermoplastic elastomer/polyolefin (polyethylene or polypropylene), multilayer bodies in various blend ratios of polyolefin+thermoplatic elastomer, polypropylene/polyethylene/polypropylene, Nylon/ethylene-vinyl acetate copolymer/Nylon, and copolymeric Nylon/ethylene-based adhesive agent/ethylene-vinyl acetate copolymer/ethylene-based adhesive agent/copolymeric Nylon. A multilayer structure of core/shell type resin having a core of thermoplastic elastomer and a shell structure of acrylic resin may be also used Further, as the rubber material, it is possible to use at least one member selected from the group of natural or synthetic fluorine-containing rubber, silicone-based rubber, acrylic-based rubber, ethylene-acrylic-based rubber, chlorinated polyethylene-based rubber, olefin-based rubber, urethane-based rubber, epichlorohydrin-based rubber, chlorosulfonated polyethylene-based rubber, acrylonitrile-butadiene-based rubber, nitrile-based rubber, styrene-butadiene-based rubber, polyvinyl chloride-based rubber, and ethylene-propylene-diene terpolymer-based rubber. These materials may be vulcanized or may be unvulcanized. As other materials, various kinds of gel materials may be also used. For example, an acrylic-based material, an urethane-based material, and a silicone-based material can be used as the gel materials. The materials are not particularly limited in kind.

In the internal glass breaking prevention material 2, if necessary, various kinds of additives for providing flame resistance and heat conducting characteristic and various kinds of compounding ingredients, such as an inorganic filler, an anti-oxidant, an age resistor, an ultraviolet absorbent, a lubricant, a softener, a pigment, a crosslinker, a vulcanizing agent, a colorant, a plasticizer, a releasant, an antiseptic agent, a coupling agent, oil, etc. may be added into the resin material made of an elastomer or viscoelastomer or into the rubber material.

The internal glass breaking prevention material 2 may be partially or wholly interposed between the glass substrate and the metal plate. The form of the internal glass breaking prevention material 2 may be a fixed form such as a sheet form or a film form or an a typical form such as a liquid form or a gel form or may be a combination of these forms. When the form of the internal glass breaking prevention material 2 is an a typical form, the internal glass breaking prevention material 2 is interposed between the glass substrate and the metal plate so that the internal glass breaking prevention material 2 does not leak from between the two. If necessary, the internal glass breaking prevention material 2 may be used after unwoven fabric is impregnated with the internal glass breaking prevention material 2. The layer structure of the internal glass breaking prevention material 2 may be of a single layer type or may be of a multilayer type. The multilayer type structure can used in the invention if the total dynamic shear modulus of all layers is not larger than $1 \times 10^9$ Pa even in the case where the dynamic shear modulus of any one layer is larger than $1 \times 10^9$ Pa. Adhesion to the glass substrate and to the metal plate is required. When this requirement cannot be satisfied, suitable adhesion donating treatment may be applied to one or each of opposite surfaces of the internal glass breaking prevention material 2. When the internal glass breaking prevention material 2 is not formed of either pressure sensitive adhesive agent or adhesive agent, the glass substrate and the metal plate are mechanically fixed and retained with each other by screws, springs, etc.

The glass breaking prevention structure constituted by the constituent members according to the invention can be formed by any optional method in accordance with the kind and composition of each of the constituent members. The way of forming the structure is not limited. As an example, there can be used a method in which the surface glass breaking prevention material 1 using a pressure sensitive adhesive agent or the like is laminated on the front surface side of the glass substrate while the metal plate is stuck onto the rear surface side of the glass substrate through the internal glass breaking prevention material 2 made of a pressure sensitive adhesive agent or the like.

In the glass breaking prevention structure constituted by the constituent members according to the invention, the surface glass breaking prevention material 1 which is transparent is directly stuck to the glass substrate. Accordingly, there is no air layer between the glass substrate and the surface glass breaking prevention material 1, so that there is no problem in double reflection of external light. The glass breaking prevention structure can be used as a glass breaking prevention structure which can be reduced in weight and thickness. Moreover, a large effect of preventing glass from breaking can be obtained by the internal glass breaking prevention material 2 interposed between the glass substrate and the metal plate.

That is, in the glass breaking prevention structure according to the invention, destructive impact energy (B) by which the glass substrate is destroyed when a steel ball 500 mm in diameter and 50 g in weight is dropped on the surface glass breaking prevention material 1 is large to be not lower than 1.2 times, preferably not lower than 1.5 times as high as destructive impact energy (A) measured in the same manner in a glass breaking prevention structure which has the same configuration except that the internal glass breaking prevention material 2 is not interposed. That is, in the glass breaking prevention structure according to the invention, the glass substrate is very hardly broken by external impact.

Accordingly, the glass breaking prevention structure according to the invention is particularly suitable for a PDP. When a function for shielding electromagnetic wave and near infrared rays, an anti-reflection function for reducing reflection of external light, a function for adjusting color in a visible region, and so on, are given to the surface glass breaking prevention material 1 or when a member having these functions is provided to be adjacent to the surface glass breaking prevention material 1, the PDP device having the glass breaking prevention structure can be used as a PDP device to which these functions are provided in addition to the features and advantages.

Description of the invention will be made below more specifically with its examples. Incidentally, the term "parts" used hereinafter means parts by weight. The dynamic shear moduli of the surface glass breaking prevention material 1 and the internal glass breaking prevention material 2 are measured in samples of 5 mm×10 mm size by the method described in detail in this specification.

EXAMPLE 1

An ultraviolet-curable acrylic-based pressure sensitive adhesive agent (dynamic shear modulus: $3\times10^4$ Pa) containing, as a main agent component, an acrylic-based polymer made from 2-ethylhexyl acrylate as a main monomer and having a glass transition point (Tg) of about –40° C. was applied onto a rear surface of a polyethylene terephthalate film (trade name "ReaLook1200" made by NOECORP.) subjected to an anti-reflection treatment to obtain reflectance of not higher than 4%. Thus, a surface glass breaking prevention material 1 mm thick was formed.

Two sheets of 30 cm-square high distortion spot glass ("PD200" 2.8 mm thick, made by ASAHI GLASS CO.) were baked and stuck onto each other so that four sides were fixed by glass paste ("ASF2300A" made by ASAHI GLASS CO.) and so that a thickness of about 150 µm and a width of about 5 mm were obtained. Thus, a glass substrate model substituted for a PDP panel was produced. The surface glass breaking prevention material was stuck onto the glass substrate.

On the other hand, an aluminum plate 1 mm thick was used as a metal plate. An ultraviolet-curable acrylic-based pressure sensitive adhesive agent (dynamic shear modulus: $3\times10^4$ Pa) containing, as a main agent component, an acrylic-based polymer made from 2-ethylhexyl acrylate as a main monomer and having a glass transition point (Tg) of about –40° C. was applied onto the metal plate to form an internal glass breaking prevention material 1 mm thick. A surface of the glass substrate opposite to the surface glass breaking prevention material was stuck onto the internal glass breaking prevention material to thereby form a glass breaking prevention structure.

COMPARATIVE EXAMPLE 1

A glass breaking prevention structure was formed in the same manner as in Example 1 except that the internal glass breaking prevention material was not formed.

COMPARATIVE EXAMPLE 2

A glass breaking prevention structure was formed in the same manner as in Example 1 except that the internal glass breaking prevention material was made of a polyethylene terephthalate film (dynamic shear modulus: $2\times10^9$ Pa) 1 mm thick.

EXAMPLE 2

A glass breaking prevention structure was formed in the same manner as in Example 1 except that the thickness of the surface glass breaking prevention material was changed to 2 mm.

EXAMPLE 3

A glass breaking prevention structure was formed in the same manner as in Example 1 except that the thickness of the surface glass breaking prevention material was changed to 3 mm.

EXAMPLE 4

A glass breaking prevention structure was formed in the same manner as in Example 1 except that an ultraviolet-curable acrylic-based pressure sensitive adhesive agent (dynamic shear modulus: $1\times10^6$ Pa) containing an isononyl acrylate-acrylic acid copolymer as a main agent component and having a glass transition point (Tg) of about –20° C. was used as the internal glass breaking prevention material to obtain a thickness of 1 mm.

EXAMPLE 5

A glass breaking prevention structure was formed in the same manner as in Example 1 except that yellowing-resistant urethane ("DUS605" made by SHEEDOM CO., LTD., dynamic shear modulus: $7\times10^7$ Pa) was used as the internal glass breaking prevention material to obtain a thickness of 1 mm.

EXAMPLE 6

A glass breaking prevention structure was formed in the same manner as in Example 1 except that an unvulcanized rubber material (dynamic shear modulus: $2\times10^6$ Pa) produced by kneading a mixture containing 100 parts of ethylene-propylene-diene terpolymer ("EPDM4021" made by MITSUI CHEMICALS INC.), 3 parts of carbon ("#50" made by ASAHI CARBON CO., LTD.), 3 parts of stearic acid (made by NOFCORP.), 500 parts of aluminum hydroxide ("HIGILITE H-34" made by SHOWA DENKO K.K.) and 80 parts of paraffinic oil ("DIANA PROCESS PW-380" made by IDEMITSU KOSAN CO, LTD.) by a pressure kneader and calendering the mixture by a calender roll was used as the internal glass breaking prevention material to obtain a thickness of 1 mm.

EXAMPLE 7

A glass breaking prevention structure was formed in the same manner as in Example 1 except that a 42-inch actual PDP panel was used as the glass substrate.

The glass breaking prevention structure obtained in each of Examples 1 to 7 and Comparative Examples 1 and 2 was subjected to a steel ball drop test by the following method. The height (cm) from which a steel ball was dropped when the glass substrate was broken, and the destructive impact energy (J) at that point of time were measured. Results of these were as shown in Table 1. Incidentally, the dynamic shear moduli of the glass breaking prevention materials were added to Table 1 for reference.

<Steel Ball Drop Test>

The glass breaking prevention structure was directly put on a floor so that the surface glass breaking prevention material faced upward. A copper ball which was 50 mm in diameter and 500 g in weight and which was fixed to a position above the floor by an electromagnet was dropped on a center portion of the surface glass breaking prevention material. The height required for breaking the glass substrate was measured at intervals of 1 cm. Whether the glass substrate was broken/cracked or not, was confirmed by eye observation to thereby evaluate the breaking of the glass substrate.

TABLE 1

| | Dynamic Shear Modulus (Pa) | | | |
|---|---|---|---|---|
| | Surface Glass Breaking Prevention Material (Thickness: mm) | Internal Glass Breaking Prevention Material (Thickness: mm) | Height of Drop of Steel Ball (cm) | Destructive Impact Energy (J) |
| Example 1 | $3 \times 10^4$ (1) | $3 \times 10^4$ (1) | 13 | 0.64 |
| Example 2 | $3 \times 10^4$ (2) | $3 \times 10^4$ (1) | 20 | 1.00 |
| Example 3 | $3 \times 10^4$ (3) | $3 \times 10^4$ (1) | 31 | 1.52 |
| Example 4 | $3 \times 10^4$ (1) | $1 \times 10^6$ (1) | 8 | 0.39 |
| Example 5 | $3 \times 10^4$ (1) | $7 \times 10^7$ (1) | 5 | 0.25 |
| Example 6 | $3 \times 10^4$ (1) | $2 \times 10^6$ (1) | 11 | 0.54 |
| Example 7 | $3 \times 10^4$ (1) | $3 \times 10^4$ (1) | 10 | 0.50 |
| Comparative Example 1 | $3 \times 10^4$ (1) | None | 2 | 0.10 |
| Comparative Example 2 | $3 \times 10^4$ (1) | $2 \times 10^9$ (1) | 2 | 0.10 |

As is obvious from the results, in accordance with the glass breaking prevention structure obtained in any one of Examples 1 to 7 of the invention, destructive impact energy is not lower than 12 times as high as that in the glass breaking prevention structure obtained in Comparative Example 1 in which the internal glass breaking prevention material is not formed. It is apparent that the effect of preventing glass from breaking is improved. The effect of preventing glass from breaking cannot be obtained in the glass breaking prevention structure obtained in Comparative Example 2 in which a material having a dynamic shear modulus larger than $1 \times 10^9$ Pa is used as the internal glass breaking prevention material.

As described above, in the invention, while a surface glass breaking prevention material, a glass substrate and a metal plate are disposed in the order, an internal glass breaking prevention material made of an elastomer or viscoelastomer having a dynamic shear modulus of not larger than $1 \times 10^9$ Pa is interposed between the glass substrate and the metal plate. Accordingly, this structure is different from a related-art DPD front plate in that there is no air layer in this structure. Hence, there can be provided a glass breaking prevention structure in which: there is no double reflection of external light; reduction in weight and thickness can be attained; the effect of preventing glass from breaking is large; and a function for shielding electromagnetic wave and near infrared rays can be optionally added to the structure Hence, a PDP device using this structure can be provided.

This invention should not be limited to the embodiments described above. Various modifications can be included in this invention within a range which can be easily realized by those skilled in the art without departing from the spirit of the scope of claim.

What is claimed is:

1. A structure for preventing glass from breaking, comprising:
    a surface glass breaking prevention material arranged on a first side of a glass substrate;
    a metal plate arranged on a second side of the glass substrate; and
    an internal glass breaking prevention material comprising at least one of an elastomer and a viscoelastomer having a dynamic shear modulus of not greater than $1 \times 10^9$ Pa and being interposed between said second side of said glass substrate and said metal plate.

2. A structure according to claim 1, wherein a destructive impact energy (B) by which said glass substrate is destroyed when a steel ball 50 mm in diameter and 500 g in weight is dropped on said surface glass breaking prevention material is not lower than 1.2 times as high as a destructive impact energy (A) measured in a same manner upon a glass breaking prevention structure having a same configuration as said structure for preventing glass from breaking except that said internal glass breaking prevention material is not interposed.

3. A plasma display device comprising a glass breaking prevention structure according to claim 1.

4. A plasma display device comprising a glass breaking prevention structure according to claim 2.

5. A structure according to claim 1, wherein said surface glass breaking prevention material comprises a thickness in a range from 0.05 mm to 10 mm.

6. A structure according to claim 1, wherein said surface glass breaking prevention material comprises one of a monolayer structure and a multilayer structure comprising a material having adhesion to the glass substrate and a shock-absorbing characteristic.

7. A structure according to claim 1, wherein said surface glass breaking prevention material comprises a surface resistivity of not larger than 3 Ω/cm².

8. A structure according to claim 1, wherein said surface glass breaking prevention material comprises a near infrared transmittance of not larger than 20%.

9. A structure according to claim 1, wherein said internal glass breaking prevention material comprises one of a monolayer having a dynamic shear modulus of not larger than $1 \times 10^9$ Pa and a multilayer structure having a total dynamic shear modulus of all layers in said multiplayer structure of not larger than $1 \times 10^9$ Pa.

10. A structure according to claim 1, wherein said internal glass breaking prevention material is formed in direct contact with the glass substrate.

11. A structure according to claim 1, wherein said internal glass breaking prevention material comprises at least one of a pressure sensitive adhesive agent, a resin material and an adhesive agent.

12. A structure according to claim 11, wherein said pressure sensitive adhesive agent comprises at least one of an acrylic-based pressure sensitive adhesive agent, a rubber-based pressure sensitive adhesive agent and a polyester-based pressure sensitive adhesive agent.

13. A structure according to claim 11, wherein said adhesive agent comprises a main component comprising at least one of a natural high-molecular compound, a semi-synthetic high-molecular compound and a synthetic high-molecular compound.

14. A structure according to claim 11, wherein said pressure sensitive adhesive agent comprises at an acrylic-based pressure sensitive adhesive agent.

15. A structure according to claim 1, wherein said surface glass breaking prevention material comprises a visible light transmittance of not less than 30%.

16. A structure according to claim 1, wherein said surface glass breaking prevention material comprises a visible light reflectance of not more than 5%.

17. A structure according to claim 1, wherein said internal glass breaking prevention material comprises a glass transition temperature not greater than 60° C.

18. A structure according to claim 1, wherein said internal glass breaking prevention material comprises a multilayer structure.

* * * * *